United States Patent [19]

Bauer

[11] 4,300,974

[45] Nov. 17, 1981

[54] CABLE DRIVE TURRET FOR DECORATION OF ARTICLES

[75] Inventor: Fritz E. Bauer, Shrewsbury, Mass.

[73] Assignee: Dennison Manufacturing Company, Framingham, Mass.

[21] Appl. No.: 183,704

[22] Filed: Sep. 3, 1980

[51] Int. Cl.³ ...................... B65H 25/00; B32B 31/00; B44C 31/00

[52] U.S. Cl. .................................... 156/360; 156/361; 156/542; 156/230; 156/DIG. 11

[58] Field of Search ............... 156/542, 361, 358, 230, 156/234, 360, 475, DIG. 26, DIG. 27, DIG. 11, DIG. 13, DIG. 40, 540; 101/33, 34

[56] References Cited

U.S. PATENT DOCUMENTS

| | | | |
|---|---|---|---|
| 3,540,968 | 11/1970 | White | 156/475 |
| 4,214,937 | 7/1980 | Geurtsen et al. | 156/542 |

*Primary Examiner*—Edward C. Kimlin
*Assistant Examiner*—L. Falasco
*Attorney, Agent, or Firm*—Arthur B. Moore; Barry D. Josephs; George E. Kersey

[57] ABSTRACT

Apparatus is disclosed for decorating the sides of bottles and similar articles having a variety of cross-sections, of the type in which a label is pressed onto the article from a carrier web while both the web and article are in motion. The apparatus includes a cam and cam follower mechanism wherein the cam is profiled in the cross-section of the article. The cam and cam follower are driven by a cable moving at the linear velocity of the carrier web in order to coordinate web advance with article rotation. The article is housed on a laterally movable swing arm during labelling to provide a variable axial location.

9 Claims, 5 Drawing Figures

CABLE DRIVE TURRET FOR DECORATION OF ARTICLES

BACKGROUND OF THE INVENTION

The present invention relates to the decoration of bottles and the like, and more particularly to decoration of bottles by means of heat transfer labelling.

Decorating systems using heat transfer labels have received widespread commercial acceptance over the last decade. Such decorating systems are typically characterized by conveyors for feeding the objects to be labelled, usually bottles; turrets for sequentially positioning the bottles at a label station; a feed mechanism for transporting labels supported by a carrier web to the labelling station; and a device for placing a label against an adjacent bottle at the labelling station. Examples of such systems appear in U.S. Pat. Nos. 2,981,432; 3,036,624; 3,064,714; 3,208,897; 3,231,448; 3,261,734; 3,313,667; 3,709,755; and 3,861,896.

A problem which poses great challenges in designing apparatus for heat transfer labelling is that of the variety of containers which may be encountered in such labelling applications. It is known in the prior art to adapt the labelling apparatus for decoration of containers of a particular shape. U.S. Pat. No. 2,981,433 discloses a machine for cylindrical bottles and U.S. Pat. No. 3,208,897 discloses a machine for bottles having oval cross-sections. Apparatus of these types suffer the limitation that they are not readily adaptable to a wide variety of bottle cross-sections.

U.S. Pat. No. 3,540,968, assigned to the assignee of the present invention, discloses a mechanism of a similar type as that of the present invention, for decorating articles of a noncircular shape. The apparatus is designed to maintain at a constant value the peripheral velocity of the rotating article to match that of the carrier web. This apparatus also includes the feature of controlling the location of the article's axis. This apparatus represents an ingenious solution to the problems inherent in decoration of noncircular articles, but suffers the limitation that the transfer roll is frictionally driven by the rotating article, thereby creating a probability of undesirable distortion of the labels. The use of a sprocket or gear to control article rotation, as taught in this patent, will result in a "polygon effect," wherein the label transfer has an undesirable segmented appearance.

Accordingly, it is a principal object of the invention to achieve apparatus for transferring labels from a carrier web to articles having a variety of cross-sections. A related object is the provision of decorating apparatus which may be easily adapted to the requirements of a particular use.

Another object of the invention is the avoidance of labelling distortions when decorating articles of unusual shapes. A related object is the coordination of a label-bearing web with the motion of an article to be labelled.

A further object of the invention is the achievement of apparatus which enables precise speed control over article motion in order to match the motion of a label-bearing web. A related object is an even, distortion-free appearance of the transferred label.

SUMMARY OF THE INVENTION

In accordance with the above and related objects, the invention provides apparatus for transferring labels from a carrier web to the periphery of bottles and other articles, such apparatus being adaptable to a variety of article cross-sections. The apparatus of the invention is designed to maintain contact between a portion of the article periphery and the carrier web, and to ensure that the article and carrier web are moving at the same linear velocity while in contact.

In accordance with one aspect of the invention, the article to be decorated is mounted in a cup which is connected to a rotatable cam. In accordance with a related aspect, the article, cup, and cam are coaxially mounted. In accordance with a further related aspect, the cam has an identical horizontal cross-section to that of the article to be labelled. The cam and article are angularly oriented in phase synchronization. In the preferred embodiment, the apparatus includes means to preorient the article prior to depositing it in the cup. In an alternative embodiment, in the case of a tapered article, the cam is profiled and oriented to reflect an average article cross-section.

In accordance with another aspect of the invention, the cam contacts a cam follower, the latter being mounted coaxially with the transfer roll. In accordance with a related aspect, the rotation of the cam is controlled by a flexible elongate member. Preferably, the flexible elongate member lies in the contact plane of the cam and cam follower. In accordance with a further related aspect, the flexible elongate member moves at the same linear velocity as the carrier web. In the preferred embodiment, the flexible elongate member comprises a cable. This manner of controlling the rotation of the cam ensures that the article periphery will move at the same linear velocity as the carrier web. In an alternative embodiment, the cam rotation is controlled by a flexible steel belt or band.

BRIEF DESCRIPTION OF THE DRAWINGS

The above and additional aspects of the invention are illustrated in the detailed description which follows, taken in conjunction with the drawings in which.

DETAILED DESCRIPTION

Figure 1:
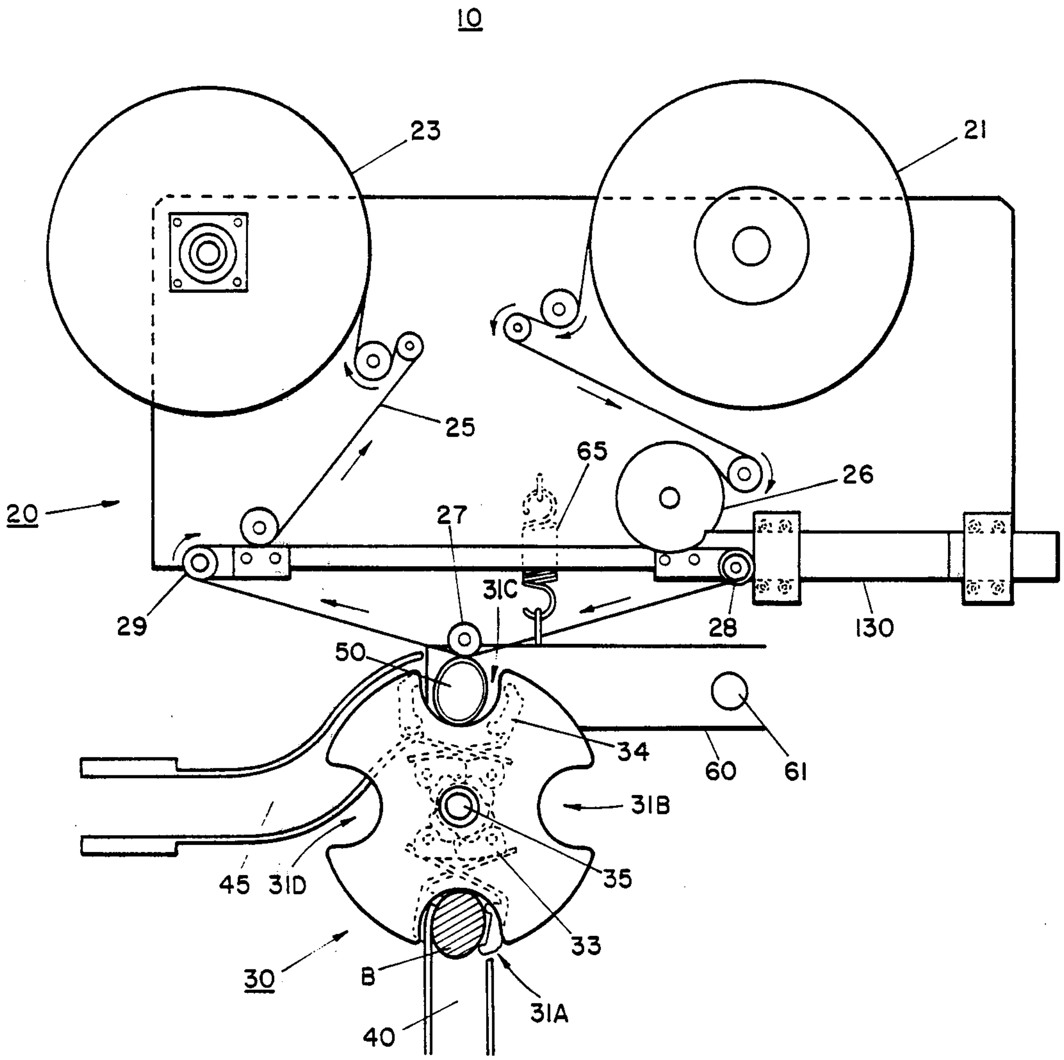
FIG. 1 is a plan view of article decorating apparatus in accordance with a preferred embodiment of the invention.

Reference should now be had to FIGS. 1-4 for a detailed description of the apparatus of the invention for decorating bottles and like articles. FIG. 1 gives a plan view of decorating apparatus in accordance with the preferred embodiment of the invention. Decorating apparatus 10 includes a carrier web transport 20 for advancing a label bearing carrier web 25, and for transferring labels from the carrier web 25 to articles B as disclosed, for example, in U.S. Pat. Nos. 2,990,311, 2,862,832 and 2,989,413. The apparatus additionally includes a turret assembly 30 for conveying articles to a decorating station where they are rotated into contact with the carrier web 25 in order to receive a label.

The general construction and mode of operation of the labelling apparatus of the invention is similar to that of the patents cited above and, being well known, need only be outlined as follows. The carrier web 25 is fed from unwind spool 21 through a series of dancer and idler rolls to the labelling area, and is further transported therefrom to a takeup spool 23. The carrier web is fed past an applicator roller or transfer roller 27 which presses the web against the side of an article B to transfer a label from the web to the article. The carrier web transport further includes a metering roll 26, as well as a pair of shuttle rolls 28 and 29 which bracket the labelling area, utilizing the carrier web transport principle disclosed, for example, in U.S. Pat. No. 3,208,897. A drive mechanism for controlling the speed of the carrier web and commensurately controlling the rotation of articles to be labelled is discussed in detail within.

Articles B are sequentially fed into turret assembly 30 from an infeed conveyor 40, which deposits each article into one of the pockets 31A–31D of the turret assembly. Once received, an article B is held between one of two gripper arms 33 and 34, which carries the article with the turret 35. A member 55 is used to push the article B into a decorator cup and to act as a centering device for the top of the article during decoration. In the case of plastic bottles the article is filled with air under pressure; this function may be effected by an inflation nozzle 55 which also acts as the centering device mentioned above. Suitable apparatus is disclosed in U.S. Pat. Nos. 3,064,714 and 3,261,734.

The decorator cup 50 is molded in the same shape as the article, which may have any cross-section subject to certain limitations discussed herein. The decorator cup 50 is rotatably mounted in a swing arm assembly 60, which pivots toward and away from the transfer roll 27 in order to control the distance of the article axis from that of the transfer roll. Article B is maintained in an upright position, its axis parallel to that of transfer roll 27, in the case of articles B which have no vertical taper. In the case of tapered articles B, the housing for the carrier web transport 20 is advantageously adapted to tilt from a horizontal orientation in accordance with U.S. Pat. No. 3,139,368. In such case, the surface of the transfer roll 27 will be inclined in order to maintain contact with the inclined article surface (for example the surface of a conical article B). In this special circumstance the axes of transfer roll 27 and article B will not be parallel.

The article B is pressed against the transfer roll with the carrier web 25 compressed therebetween, and the article B rotates in conjunction with decorator cup 50, its tangential velocity matching the advance of carrier web 25 during label transfer as more fully explained herein. After completion of label transfer, the article is released from the decorator cup 50 and removed on outfeed conveyor 45.

Figure 2:
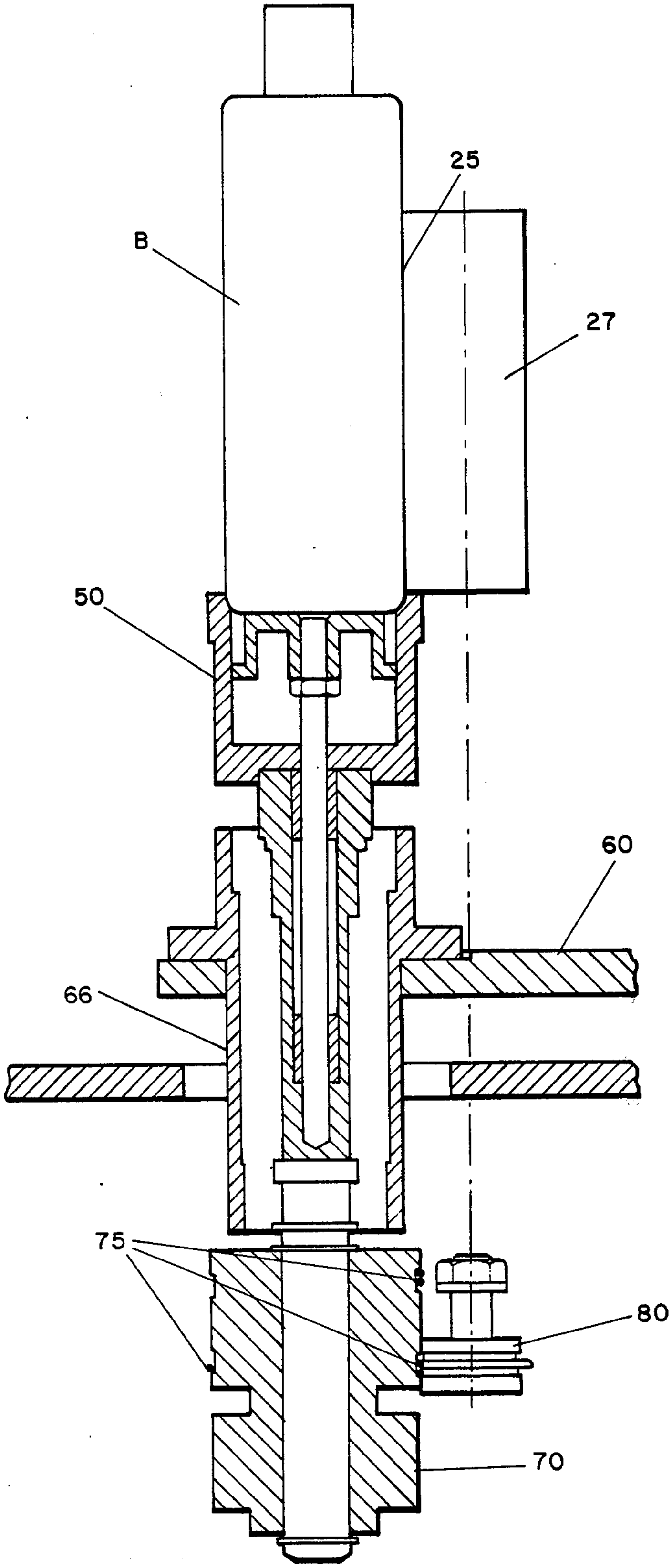
FIG. 2 is a sectional elevation view of the decorator cup, transfer roll, and associated drive mechanisms of the apparatus of FIG. 1.

FIG. 2 shows in section the decorator cup 50, transfer roll 27, and associated mechanisms for controlling their rotation as well as the location of the decorator cup. The decorator cup 50 is interconnected by a shaft 66 to a cam 70 which is coaxially mounted in order to rotate in conjunction therewith. The cam 70 has an identical horizontal cross-section to that of article B and the two should be angularly oriented in phase synchronization. With reference to FIG. 1, grippers 33 and 34 preorient articles B for this purpose prior to placing them in decorator cup 50.

In the case of tapered articles B, such as conical articles of the type illustrated in U.S. Pat. No. 3,139,368, the profile and angular orientation of cam 70 preferably matches the horizontal cross-section of article B at the mean height of that portion of the articles which is to receive a label. This will result in a slight shrinking of that part of a label which is transferred to a narrower portion of the article, and slight stretching of that part of the label which is transferred to a broader article portion.

Cam 70 contacts a cam follower 80, which is located directly below the transfer roll 27. Neither transfer roll 27 nor cam follower 80 are subject to translational motion. The rotation of cam 70 and cam follower 80 is regulated by a cable or series of cables 75. Cables 75 are placed so that their pitch lines will be located in the plane of the contact surface between cam 70 and cam follower 80. Cam 70 and cam follower 80 are advantageously recessed for this purpose. The peripheral velocity of the cam and cam follower therefore match the linear velocity of the cable; by this device, the peripheral velocity of the article, which has the identical cross-section to that of the cam, will match this instantaneous value. Preferably, article B has a convex periphery in order that cable 75 may effectively drive the cam 70 of identical cross-section. The advance of cable 75 is regulated in turn to correspond over time to the velocity of the carrier web 25 as further explained within. In the preferred embodiment, in which cable 75 has a constant linear velocity to match the constant speed of carrier web 25, cam 70 and article B will have a variable angular velocity. By this means, the decorator apparatus of the invention avoids the stretching or shrinking of transferred labels due to speed differentials.

Figure 2A:
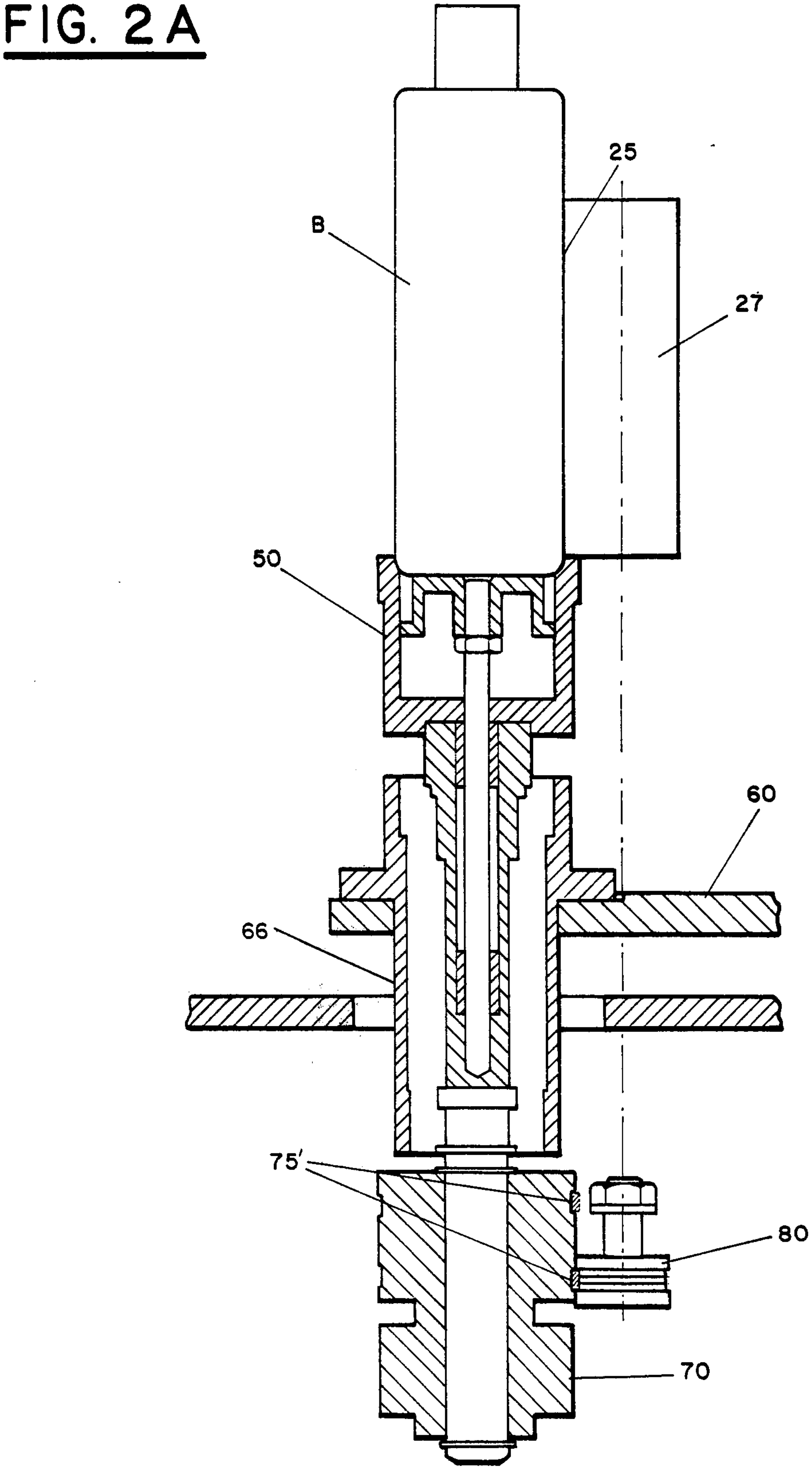
FIG. 2A is a sectional elevation view of the decorator cup, transfer roll, and associated drive mechanisms in accordance with an alternative embodiment of the invention.

FIG. 2A depicts an alternative embodiment of the mechanism for controlling article rotation. In lieu of cables 75, the driving apparatus includes belts or bands 75′, illustratively comprising flexible steel belts.

Figure 3:
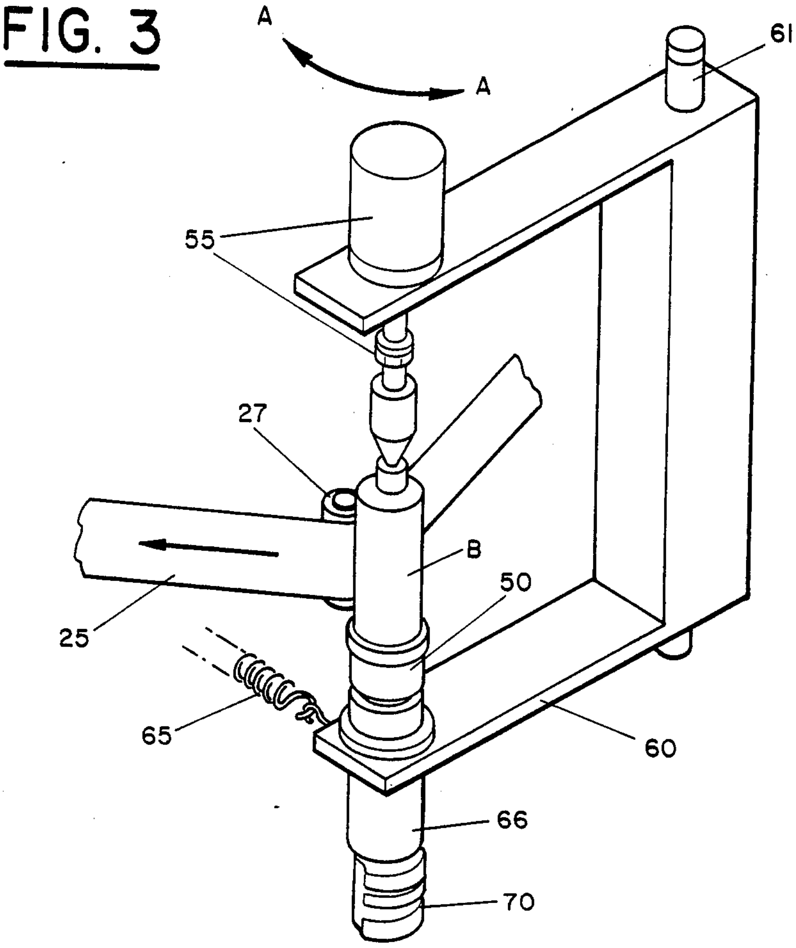
FIG. 3 is a perspective view of the decorating station of the apparatus of FIG. 1, as seen from above.

FIG. 3 illustrates the preferred manner of mounting the decorator cup 50, wherein the cup is rotably mounted on a swing arm 60. Swing arm 60 is pivotally mounted at 61, so as to permit lateral movement of the decorator toward and away from the transfer roll 27, as shown by arcuate arrows A—A. In the preferred embodiment, swing arm 60 includes an assembly 55 for lowering a nozzle or top support into the article B. Advantageously, the nozzle of assembly 55 rotates in conjunction with article B during decoration. Swing arm 60 is attached to a spring 65 or similar tensioning member which exerts a pull toward the transfer roll and carrier web, thereby maintaining contact between cam 70 and cam follower 80. The tension created by spring 65 is advantageously combined with an adjustable setting of transfer roll 27 to cause the carrier web 25 to be compressed between transfer roll 27 and article B during labelling.

The lateral movement of swing arm 60 is basically controlled by cam 70 (see FIG. 2). Due to the shape and orientation of cam 70, the axis of decorating cup 50 will be maintained over time at a distance from transfer roll 27 corresponding to the instantaneous radius of the article along the line between the axes of transfer roll 27 and article B.

Figure 4:
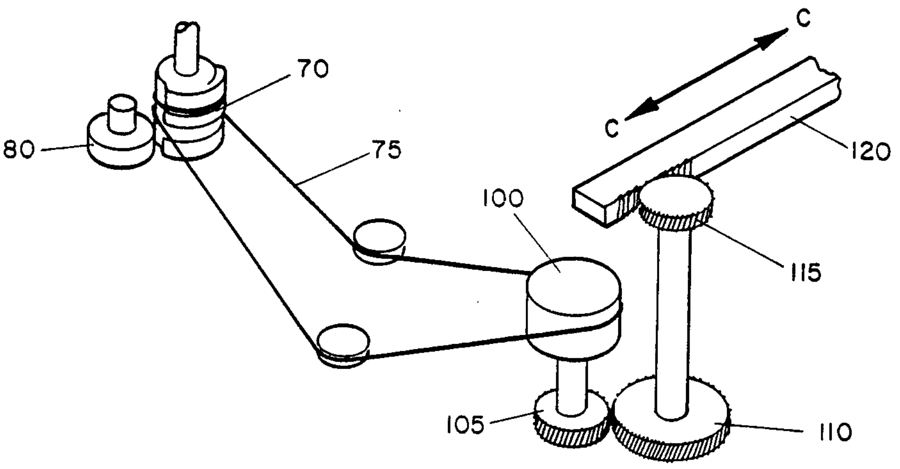
FIG. 4 is a schematic view of an illustrative drive linkage for the carrier web and drive mechanisms of FIG. 2.

With reference to the schematic view of FIG. 4, the advance of cable 75 is controlled by a drive system which coordinates this advance with the means for regulating the advance of carrier web 25. Advantageously transfer roll 27 is internally driven by the carrier web drive apparatus so as to rotate at a peripheral velocity which matches the speed of carrier web 25. An illustrative drive system for cables 75 includes drum 100 coaxially mounted with drive pinion 105, driven by drive gear 110 and pinion 115, which is in turn driven by shuttle rack 120 (shown in part). Shuttle rack 120 provides a reciprocating motion C—C which matches the reciprocation of a slide 130 on which is mounted shuttle rolls 28 and 29 (see FIG. 1).

During article decoration, reciprocating slide 130 provides a constant web speed and shuttle rack 120 provides an identical rate of advance of cable 75. Suitable carrier web transport apparatus is disclosed in the prior art, such as in U.S. Pat. No. 3,208,897. In this system, the shuttle roll in combination with metering roll 26 provides a constant web advance during the decorating portion of the machine cycle, with an intervening period of retarded motion or dwell in order to minimize wasted web motion. The drive system for cables 75 may be appropriately modified to reflect any changes in the carrier web transport.

In an alternative embodiment of the invention, the above disclosed apparatus may be employed to provide a controlled stretching or shrinking of labels transferred from carrier web 25 to articles B. This would merely require modifying the drive apparatus of FIG. 4 to achieve a desired speed differential between cables 75 (and therefore the periphery of articles B) and carrier web 25.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Improved apparatus for transferring indicia from a carrier web to articles, of the type including an indicia-bearing carrier web, means for advancing the carrier web past a labelling site, means for controlling the speed of the carrier web at the labelling site, a roll for impressing the carrier web against an article, a rotatable support for the article, means for rotating the support about an axis at a peripheral velocity matching the speed of the carrier web, and means for moving the support toward and away from the impressing roll, wherein the improvement comprises improved means for rotating the article support, comprising:

- a cam mounted coaxially with said article support so as to rotate in conjunction therewith, said cam being profiled and angularly oriented in accordance with a horizontal cross-section of the article;
- a cam roll in rotating contact with said cam;
- a flexible elongate member running between said cam and cam roll in the plane of their contact surface; and
- means for advancing said flexible elongate member at a controlled relationship to the speed of the carrier web.

2. Apparatus as defined in claim 1 wherein said flexible elongate member is advanced at the speed of the carrier web.

3. Apparatus as defined in claim 1, wherein a portion of the article to be labelled has a constant horizontal crosssection.

4. Apparatus as defined in claim 1, for decoration of tapered articles, wherein the cam is profiled and angularly oriented in accordance with a mean horizontal cross-section of the article.

5. Apparatus as defined in claim 1, wherein the flexible elongate member comprises a cable.

6. Apparatus as defined in claim 1 wherein the flexible elongate member comprises a band.

7. Apparatus as defined in claim 1 wherein said cam roll is oriented along the axis of said impressing roll.

8. Apparatus as defined in claim 1 further comprising improved means for laterally moving the article support, comprising:

- a housing for the article support, said housing being pivotally mounted so as to be moveable in a plane transverse to the article axis; and
- means for yieldingly forcing said housing toward said impressing roll.

9. Apparatus as defined in claim 1 of the type in which the means for controlling the speed of said carrier web provides an intermittent rate of advance of the carrier web at the labelling site.

* * * * *